US006159879A

United States Patent [19]

Hesch

[11] Patent Number: 6,159,879

[45] Date of Patent: Dec. 12, 2000

[54] BUILDING MATERIAL MADE FROM BAST FIBERS, SHIVES, AND A BINDER

[75] Inventor: Rolf Hesch, Lemgo, Germany

[73] Assignee: Moeller Plast GmbH, Bielefeld, Germany

[21] Appl. No.: 09/283,906

[22] Filed: Apr. 1, 1999

Related U.S. Application Data

[63] Continuation of application No. PCT/DE97/02074, Sep. 16, 1997.

[30] Foreign Application Priority Data

Oct. 1, 1996 [DE] Germany .......................... 196 40 622

[51] Int. Cl.[7] ........................................ B32B 5/02

[52] U.S. Cl. .......................... 442/152; 442/334; 442/417; 428/326; 428/311.7; 428/311.9

[58] Field of Search .................................... 428/323, 326, 428/311.9, 311.7; 442/152, 334, 417

[56] References Cited

U.S. PATENT DOCUMENTS

| | | | |
|---|---|---|---|
| 4,364,979 | 12/1982 | Dutton | 428/2 |
| 5,393,214 | 2/1995 | Irie et al. | 425/81.1 |
| 5,958,130 | 9/1999 | Stroeml et al. | 106/653 |
| 5,969,010 | 10/1999 | Kolla et al. | 524/9 |

FOREIGN PATENT DOCUMENTS

| | | | |
|---|---|---|---|
| 8566 | 3/1980 | European Pat. Off. . | |
| 744261 | 11/1996 | European Pat. Off. . | |
| 2298430 | 9/1976 | France . | |
| 2704175 | 11/1994 | France . | |
| 196 40 622 C2 | 4/1998 | Germany . | |
| WO 98/14313 | 4/1998 | WIPO | B27N 3/14 |

OTHER PUBLICATIONS

Derwent printout of GB 2268517 patent family citing US 5393214.

*Primary Examiner*—Terrel Morris
*Assistant Examiner*—Cheryl Juska
*Attorney, Agent, or Firm*—Herbert L. Lerner; Laurence A. Greenberg; Werner H. Stemer

[57] ABSTRACT

A building material includes shives, previously considered to be a waste material. Shives of bast fibers are added to bast fibers and a binder. The shives may contain fibers which are still partially attached to the shives with their natural bond. These partially attached fibers project laterally from the shives in an irregular fashion and are between 2 mm and 100 mm long. The shives and the loose fibers and/or the shives with the partially attached fibers are fed into a coating device for liquid additives and/or into a spreading system for solid additives, and subsequently form a fleece or cake. An air flow may be used for performing a mechanical felting of the fleece. A method and an apparatus for producing the building material are also provided.

7 Claims, 2 Drawing Sheets

BUILDING MATERIAL MADE FROM BAST FIBERS, SHIVES, AND A BINDER

CROSS-REFERENCE TO RELATED APPLICATION

This application is a continuation of copending International Application No. PCT/DE97/02074, filed Sep. 16, 1997, which designated the United States.

BACKGROUND OF THE INVENTION

Field of the Invention

The invention relates to a building material, using bast fibers and a binder, and to a method and an apparatus for producing such a building material.

Building materials based on synthetic and mineral raw materials or synthetic and mineral semifinished materials are known. It is also known that these materials may include natural fiber materials. Such materials are for example used for the interior trim of automobile doors. Moldings are produced based both, on duroplastics and on thermoplastics as a matrix. These moldings are reinforced by glass fibers, bast fibers, sisal and the like. The matrix may be foamed in order to reduce the weight. Fibers from bast fiber plants, which are completely or substantially free of shives, are used for this purpose. A higher shive fraction is acceptable in the case of flax and oil linen than in the case of hemp and jute, since they are finer.

Wood fragments from bast fiber plants, which are formed when the bast fibers are separated from the ligneous core, are called shives. For this purpose, the stalks are fed in full length or in portions of the stalk to corresponding apparatuses. The apparatuses break up the brittle wood core into fragments and at the same time separate the bast fiber from the wood. By "scutching" or "tangle fiber hackling" and subsequently using machines for cutting off residual shives from the fibers, either an almost shive-free long fiber or a tow with a certain residual shive fraction is then produced.

Depending on the structure of the production plant, short fibers with a relatively high shive fraction and relatively low-fiber shives are produced as a byproduct. The short fibers, of a length of between two and thirty millimeters, are freed of the residual shives in further process steps and are sold mainly to the paper industry, in particular the cigarette paper industry. The substantially fiber-free shives have to be disposed of. According to most recent developments, decortication, i.e. removing the wooden materials, is already carried out in the field, so that the shives, for which there is hardly any use at the present time, can be left directly as waste in the field. In earlier decades, the fibers from bast fiber plants were used predominantly for the production of clothing textiles and industrial textiles (ship's sails, ropes, tarpaulins, tents and the like). These textiles have since been largely replaced by synthetic fibers. With growing ecological awareness, attempts are being made, throughout the world, to reintroduce bast fibers. The main field of use is nonwovens for the production of interior fittings and equipment of passenger vehicles and for insulating purposes in the building industry.

After being decorticated, the fibers have to undergo a number of costly cleaning and opening operations. These operations inevitably shorten the fibers and they become pliable and soft. However, nonwovens made from soft fibers will collapse. Since they become too dense when they collapse, they are difficult to impregnate with thermoplastic melts or are difficult to impregnate evenly. This also applies to the spray-coating or cast-coating of thermosets or duroplastics of a synthetic or a biological type. Due to the collapsing, these materials lose some of their insulating value, when used as fleeces for insulating materials. Synthetic fibers, which prevent collapse due to their brittleness, therefore have to be admixed. Shives are, in principle, extremely light wood, almost as light as balsa wood. They are rigid and brittle and possess a fibrous structure. Their density is in the range of between 250 and 350 kg/$M^3$. After breaking, they do not have a very high degree of fineness. In contrast to shives, fibers from bast fiber plants, also short fibers, have a very high strength and a very high degree of fineness. Customarily, bast fibers and shives are always thoroughly separated, since, for further processing operations with the currently available machines and technologies for the production of fleeces, mats and balls, as well as for spinning and for currently known products, shives have a disruptive effect and oftentimes even make processing impossible.

SUMMARY OF THE INVENTION

It is accordingly an object of the invention to provide a building material and structural parts as well as a method and an apparatus for producing the building material and the structural parts, which economically utilize shives.

With the foregoing and other objects in view there is provided, in accordance with the invention, a building material, comprising:

shives of bast fiber plants;

a first multiplicity of bast fibers separate from the shives;

a second multiplicity of bast fibers in a natural bond with some of the shives, partially detached from some of the shives and irregularly projecting laterally from some of the shives; and a binder for binding the shives and the first and second multiplicity of bast fibers to form the building material.

In accordance with a further feature of the invention, the shives have lengths of between 2 and 50 mm and the second multiplicity of bast fibers have lengths of between 2 and 100 mm.

In accordance with another feature of the invention, the first multiplicity of bast fibers have lengths of between and 2 and 80 mm.

In accordance with another feature of the invention, the first and the second multiplicity of bast fibers have a crimped shape.

In accordance with a further feature of the invention, the shives and the first and second multiplicity of bast fibers form a loose structure having contact points, the binder fixing the loose structure at the contact points.

In accordance with yet a further feature of the invention, a matrix formed from a material selected from the group consisting of synthetic plastic, biogenous plastic, mineral materials, and foam is provided, the shives and the the first and second multiplicity of bast fibers are introduced into the matrix.

In accordance with another feature of the invention, the shives are shives separated in a fiber direction for increasing a degree of fineness and homogeneity.

With the object of the invention in view there is also provided, a method of producing a building material, the method which comprises:

providing bast fibers and shives of bast fiber plants;

loosening the bast fibers and the shives of bast fiber plants;

metering the bast fibers and the shives of bast fiber plants;

subsequently feeding the bast fibers and the shives of bast fiber plants to at least one of an applicator device for liquid additives and a spreading system for solid additives; and subsequently spreading the bast fibers and the shives of bast fiber plants in the form of one of a fleece and a cake.

In accordance with another mode of the invention, at least one of the liquid additives and the solid additives are homogeneously incorporated into the bast fibers and the shives of bast fiber plants.

In accordance with yet another mode of the invention, the bast fibers and the shives of bast fiber plants in the form of one of the fleece and the cake are mechanically felted by an air flow.

In accordance with a further mode of the invention, the bast fibers and the shives of bast fiber plants, mixed with at least one of the liquid additives and the solid additives, are provided in the form of a loose layer and the bast fibers and the shives of bast fiber plants in the form of the loose layer are combed off, swirled and homogenized with a spiked stripping and mixing roller.

With the object of the invention in view there is furthermore provided, an apparatus for producing a building material, comprising:

an upper rotating mechanical supply conveyor for feeding bast fibers and shives of bast fiber plants;

a hopper feeder downstream of the upper rotating mechanical supply conveyor receiving the bast fibers and the shives of bast fiber plants from the upper rotating mechanical supply conveyor;

a rotating floor belt downstream of the hopper feeder, the rotating floor belt receiving the bast fibers and the shives of bast fiber plants from the hopper feeder and having a carding device for premetering.

In accordance with another feature of the invention, there is provided a layer-height limiter in the shape of a slide with a comb, the layer-height limiter associated with the hopper feeder.

In accordance with a further feature of the invention, a steep-belt conveyor with a carding device is provided downstream of the rotating floor belt and a spiked evener roller, operatively connected to the steep-belt conveyor, for fine metering and postmetering.

In accordance with yet a further feature of the invention, a spiked stripping roller operatively connected to the steep-belt conveyor and a cleaning roller operatively connected to the spiked stripping roller are provided.

In accordance with a further feature of the invention, a breaking/spreading-head combination formed from two counterrotating rollers is provided for adding additives to the bast fibers and the shives of bast fiber plants.

In accordance with another feature of the invention, at least one mixing conveyor downstream of the steep-belt conveyor is provided for forming a loose fleece from the bast fibers and the shives of bast fiber plants.

In accordance with yet another feature of the invention, a nozzle system is provided downstream of the steep-belt conveyor for spraying liquid additives onto the bast fibers and the shives of bast fiber plants flowing down from the steep-belt conveyor.

In accordance with a further feature of the invention, a nozzle system is provided for spraying liquid additives onto the loose fleece being formed.

In accordance with yet a further feature of the invention, a spreading system is provided for spreading solid additives onto the bast fibers and the shives of bast fiber plants.

In accordance with another feature of the invention, a spiked stripping and mixing roller operatively connected to the at least one mixing conveyor is provided for combing off, swirling and homogenizing the bast fibers and the shives of bast fiber plants.

In accordance with yet another feature of the invention, a traveling screen downstream of the rotating floor belt and vacuum boxes are provided for generating an air flow in the direction of the travelling screen.

The object of the invention is achieved, according to the invention, in that shives from bast fiber plants are admixed in a controlled manner to building materials, using bast fibers and a binder, wherein incompletely detached fibers are connected, in their natural bond, to the shives. In one embodiment of the invention, the fibers project laterally from the shives in an irregular manner. In a preferred embodiment, the shives have lengths of between 2 and 50 mm, the fibers partially bonded to the shives have lengths of between 2 and 100 mm and the loose fibers have lengths of between 2 and 80 mm. The fibers may have a crimped or curled form.

The method of the invention for producing a building material using shives includes the following steps. The shives and the loose fibers and/or the shives together with the incompletely detached fibers are fed, after appropriate loosening and metering, to an applicator device for liquid additives and/or to a spreading system for solid additives and are subsequently spread as a fleece or cake. The shives and fibers of the fleece or cake may be mechanically felted through the use of an air flow.

In an apparatus according to the invention for carrying out the method of producing a building material, a hopper feeder is preceded by an upper rotating mechanical supply conveyor and is followed by a rotating floor belt with a carding device, a card clothing device, or a scraping device for premetering, a layer-height limiter in the form of a slide with a comb which may be assigned to the hopper feeder. In a preferred embodiment, a steep-belt conveyor with a carding device, a card clothing device, or a scraping device and a spiked evener roller or spiked stripper roller are provided for fine metering and postmetering.

Other features which are considered as characteristic for the invention are set forth in the appended claims.

Although the invention is illustrated and described herein as embodied in a building material and a method and an apparatus for producing a building material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
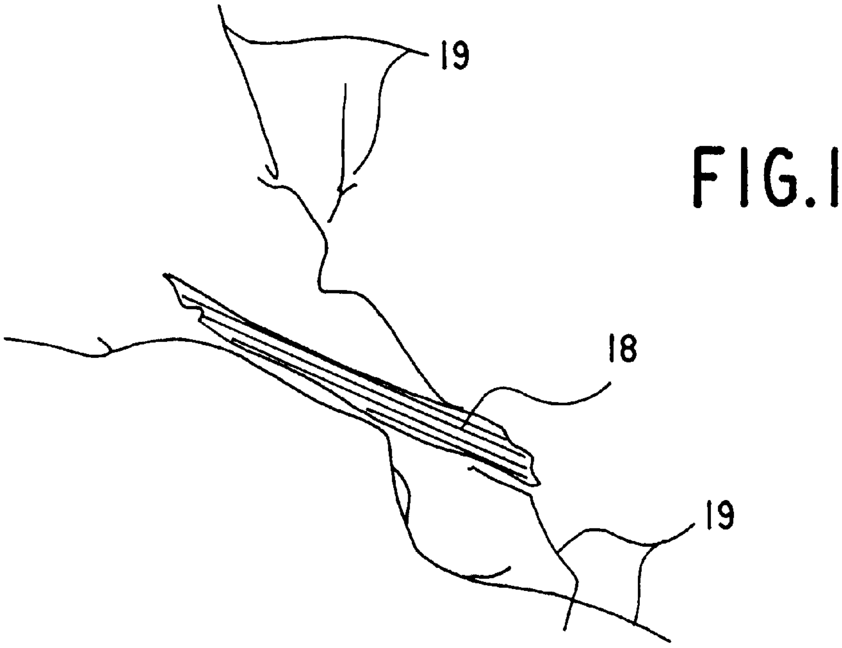
FIG. 1 is a diagrammatic view of a shive with incompletely detached fibers.
Figure 2:
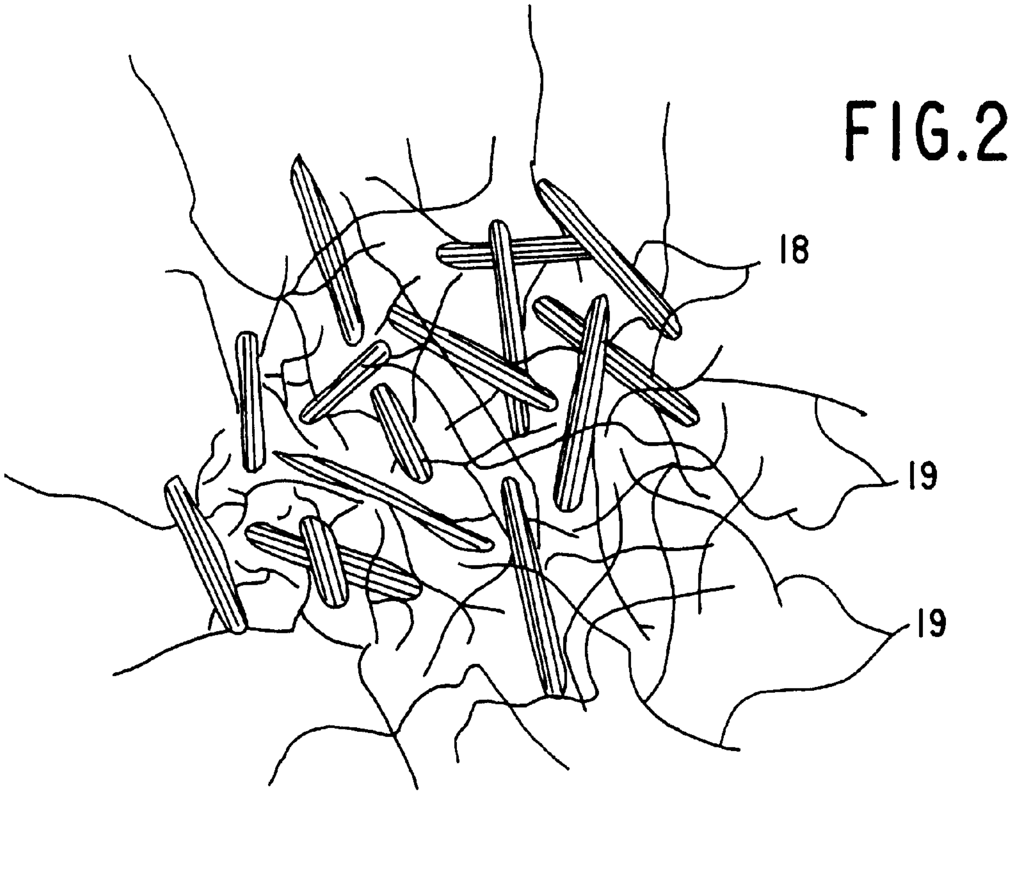
FIG. 2 is a diagrammatic view of shives and fibers illustrating the principle of forming a fleece from the shives of FIG. 1.

Referring now to the figures of the drawings in detail and first, particularly, to FIG. 1, it is shown that fibers 19 are detached only partially, albeit to a major extent, from a shive 18. The fiber lengths are specifically in the range of 5 to 100 mm. The fibers 19 incompletely detached from the shive 18 project laterally in a tangled manner. Through the use of suitable measures, for example by shoving or rubbing, the tangled structure of the fiber 19 can be further intensified in a controlled manner. Whilst shives 18 cleaned of short fibers have apparent densities of between 90 and 120 kg/$m^3$, depending on the type of separation, the apparent density can be reduced to 15 kg/$m^3$ if there is only partial decortication. On account of their natural longitudinal axis, shives cleaned of fibers lie essentially parallel to one another. If shives and fibers are mixed, a somewhat fiber-directionless, that is to say isotropic, configuration is formed. In the case of fibers 19 incompletely detached from the shive 18, large interspaces are formed due to the tangled structure, as shown in FIG. 2. A multiplicity of contact and intersection points are generated between shives 18 and fibers 19, in addition to the natural growths at the locations where the bond between the wood and bast fiber 19 has deliberately not been eliminated due to incomplete decortication.

Figure 3:
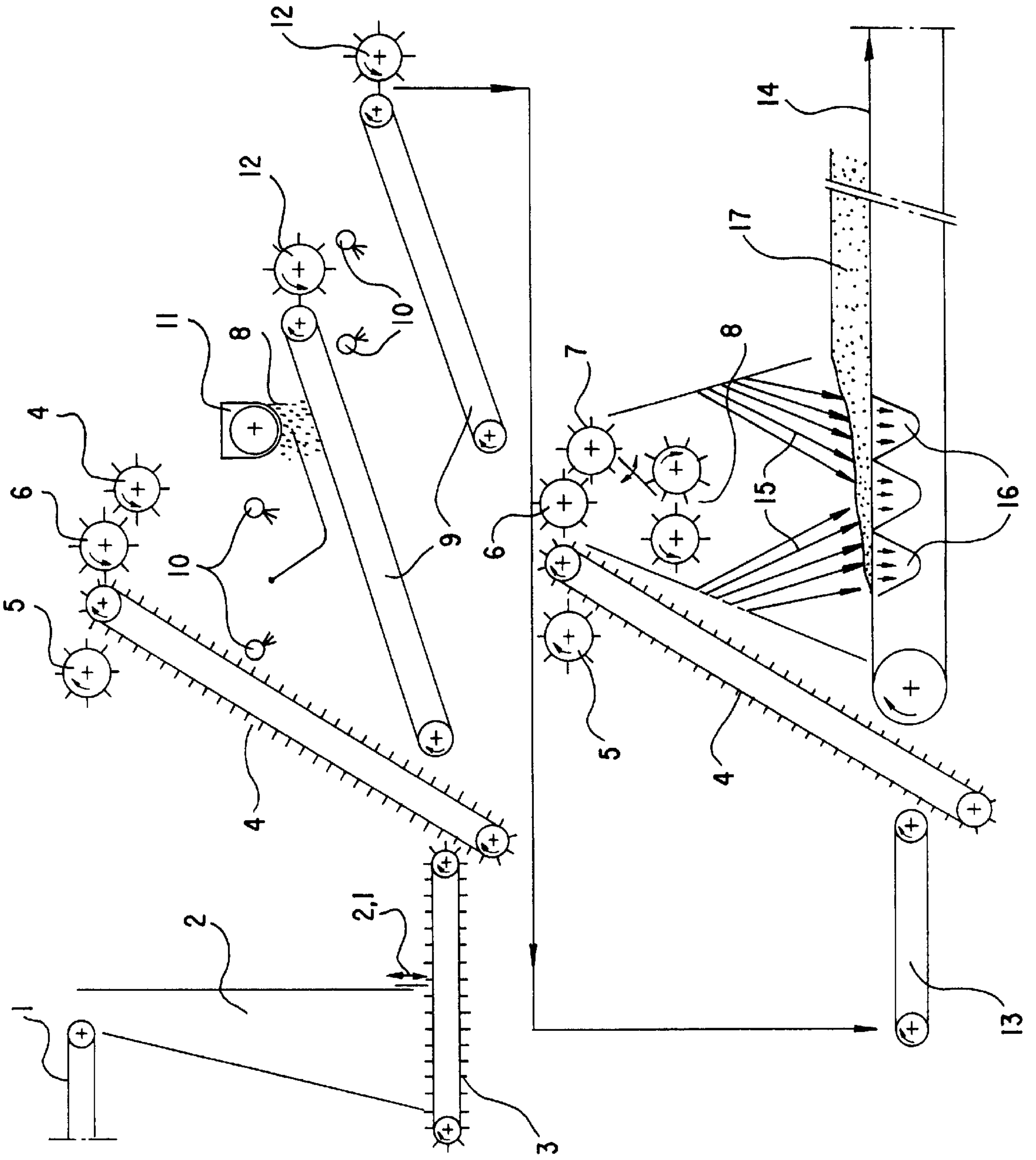
FIG. 3 is a diagrammatic, elevational side view of an apparatus for producing the building material.

According to FIG. 3, a mechanical supply conveyor 1 in the form of a rotating belt is disposed above a hopper feeder 2. The supply conveyor 1 oscillates over the entire width of the hopper feeder 2. A slide 2.1 with a comb as a layer-height limiter is assigned to the hopper feeder. A floor belt 3 with a card clothing runs below the hopper feeder 2. The advance of the floor belt 3 is continuously adjustable. When the height of the layer is limited by the slide 2.1, this layer is milled or scraped off by the floor belt 3 with the card clothing. Quantity metering is carried out via the speed of advance. In order to convey the material, thus premetered, to a sufficient height for further breaking or loosening and to allow fine metering, a steep-belt conveyor 4 with a card clothing is provided. A spiked evener roller 5 runs at an adjustable distance from the steep-belt conveyor 4. In order to strip off or comb off the material from the steep-belt conveyor 4, a spiked stripping roller 6 meshing or combing with the steep-belt conveyor 4 is provided. The rotational speed of the spiked stripping roller 6 is variable, so that, in addition to the stripping off or combing off of the material, the degree of loosening can also be influenced.

As illustrated, a cleaning roller 7, which may be constructed as a spiked, brush, or fan roller, serves for cleaning the spiked stripping roller 6. It is also possible to provide in series a plurality of groups of steep-belt conveyors 4, spiked evener rollers 5, spiked stripping rollers 6 and cleaning rollers 7 in a plurality of groups. A breaking/spreading-head combination 8 is provided after the last group. The material falling off from the steep-belt conveyor 4 is received by a mixing conveyor 9. A loose fleece 17 is formed on this conveyor 9, wherein liquid additives, via a nozzle system 10, and/or solid additives, via a spreading system 11, have been applied beforehand. If required, more than one mixing conveyor 9 may be provided. Each mixing conveyor 9 is assigned a spiked stripping and mixing roller 12. The roller 12 may also be constructed as a spiked roller, brush roller, or fan roller. Through the use of the roller 12, the material, mixed, more or less in layers, with additives on the mixing conveyor 9, is combed off and swirled in order to break the layers and for homogenization. The material is subsequently fed via a conveyor belt 13 to an assembly group which is largely identical to the steep-belt conveyor 4, the rollers 5 to 7 and the breaking/spreading-head combination 8. Then, a final spreading or fleece formation 17 takes place, since the shives 18 and fibers 19 are sufficiently mixed with the additives. Alternatively, it is possible to deposit the material into containers or molds.

If tangle-fiber fleece formation is desired or if tangle-fiber fleece formation is to be improved, the material may be forced onto a travelling screen 14 through the use of an air flow 15. Vacuum boxes 16, which are provided below the travelling screen 14 receiving the material, serve for generating the air flow 15. The air flow has a velocity of between 2 and 20 m/sec. At this velocity, the particles are not disposed parallel to one another, but are blast or shot one into the other. The particles thereby acquire a fiber-directionless configuration and thus form a tangle-fiber fleece.

I claim:

1. A building material, comprising:

shives of bast fiber plants;

a first multiplicity of bast fibers separate from said shives;

a second multiplicity of bast fibers in a natural bond with some of said shives, partially detached from some of said shives and irregularly projecting laterally from some of said shives; and a binder for binding said shives and said first and second multiplicity of bast fibers to form the building material.

2. The building material according to claim 1, wherein said said shives have lengths of between 2 and 50 mm and said second multiplicity of bast fibers have lengths of between 2 and 100 mm.

3. The building material according to claim 1, wherein said first multiplicity of bast fibers have lengths of between and 2 and 80 mm.

4. The building material according to one of claims 1, wherein said first and said second multiplicity of bast fibers have a crimped shape.

5. The building material according to claim 1, wherein said shives and said first and second multiplicity of bast fibers form a loose structure having contact points, said binder fixing said loose structure at said contact points.

6. The building material according to claim 1, further including a matrix formed from a material selected from the group consisting of synthetic plastic, natural polymer, mineral materials, and foam, said shives and said said first and second multiplicity of bast fibers introduced into said matrix.

7. The building material according to claim 1, wherein said shives are shives separated in a fiber direction for increasing a degree of fineness and homogeneity.

* * * * *